United States Patent
Kozlowski et al.

(10) Patent No.: US 7,740,401 B2
(45) Date of Patent: *Jun. 22, 2010

(54) FOOD MIXING MACHINE AND AGITATOR THEREFOR

(75) Inventors: Eugene J. Kozlowski, Medina, OH (US); Fred H. Mehlman, Brunswick, OH (US); Laura L. Manson, Medina, OH (US)

(73) Assignee: Vita-Mix Corporation, Cleveland, OH (US)

( * ) Notice: Subject to any disclaimer, the term of this patent is extended or adjusted under 35 U.S.C. 154(b) by 432 days.

This patent is subject to a terminal disclaimer.

(21) Appl. No.: 11/787,239

(22) Filed: Apr. 16, 2007

(65) Prior Publication Data

US 2008/0253224 A1    Oct. 16, 2008

(51) Int. Cl.
*A47J 43/07* (2006.01)
*B01F 7/32* (2006.01)

(52) U.S. Cl. .................. 366/317; 366/325; 366/343

(58) Field of Classification Search ............. 366/325.7, 366/325.94, 325.91, 197, 198, 328.1, 329.1–329.2, 366/315–317, 279, 331, 342–343, 325.1, 366/64–66, 96–98, 129; 416/227 R, 227 A; D7/412, 415
See application file for complete search history.

(56) References Cited

U.S. PATENT DOCUMENTS

| | | | | |
|---|---|---|---|---|
| 270,015 A * | 1/1883 | Carter | ...................... | 366/243 |
| 684,966 A * | 10/1901 | Weisenback | ............. | 366/325.7 |
| 846,661 A * | 3/1907 | Godward | ...................... | 416/76 |
| 1,055,484 A * | 3/1913 | Mohr | ...................... | 416/214 R |
| 1,075,119 A | 10/1913 | Reichner | ...................... | 99/508 |
| 1,217,832 A * | 2/1917 | Saito | ........................... | 416/77 |
| 1,460,493 A * | 7/1923 | Leinan | ....................... | 416/76 |
| 1,492,448 A * | 4/1924 | Gotis | ....................... | 366/325.7 |
| 1,661,336 A | 3/1928 | Katz | ........................... | 99/508 |
| 1,738,112 A * | 12/1929 | Myers | ....................... | 416/122 |
| 1,837,636 A | 12/1931 | Voss | ............................. | 68/133 |
| 1,878,924 A | 9/1932 | Henry | ....................... | 366/130 |
| D90,534 S | 8/1933 | McArdie et al. | ............. | D7/383 |

(Continued)

FOREIGN PATENT DOCUMENTS

FR    2670376 A1 * 6/1992

OTHER PUBLICATIONS

Drawings from U.S. Appl. No. 29/268,317 Nov. 2006 Kozlowski et al.
Admitted prior art device from Duke made for Dairy Queen.
Admitted prior art device from Big Chill Machine of Hamilton Beach.

*Primary Examiner*—Charles E Cooley
(74) *Attorney, Agent, or Firm*—Renner, Kenner, Greive, Bobak, Taylor & Weber

(57) ABSTRACT

A food mixer (10) includes a rotatable shaft (18) which is connected to the shaft (21) of an agitator (20). The agitator (20) includes an upper disk (23) attached to the shaft (21) and a lower disk (28). Slat walls (27, 29) extend from the upper disk (23) to the lower disk (22) and slat walls (27, 29) are curved so as to together forming a parabolic ring. A central blade (33) extends from the upper disk (23) to the lower disk (28) between the slat walls (27, 29). Both the upper and lower disks (23, 28) are circular and are curved upwardly in one direction and curved downwardly in a direction transverse to the one direction.

16 Claims, 4 Drawing Sheets

U.S. PATENT DOCUMENTS

| | | | | |
|---|---|---|---|---|
| 1,966,352 | A * | 7/1934 | Mahony | 416/75 |
| 2,093,586 | A * | 9/1937 | Day | 425/456 |
| D118,249 | S * | 12/1939 | Seyfried | D7/415 |
| 2,254,236 | A * | 9/1941 | Myers | 416/131 |
| 2,452,923 | A * | 11/1948 | Graff | 416/142 |
| 2,630,303 | A * | 3/1953 | Krucker | 366/331 |
| 4,112,311 | A * | 9/1978 | Theyse | 290/44 |
| 4,311,158 | A * | 1/1982 | Harvey | 134/138 |
| 4,818,114 | A | 4/1989 | Ghavi | 366/130 |
| D305,973 | S | 2/1990 | Barnard et al. | |
| D374,150 | S | 10/1996 | Lillelund et al. | D7/387 |
| 6,012,473 | A * | 1/2000 | Koyama | 134/149 |
| D421,545 | S | 3/2000 | Ekstrom | D7/412 |
| D424,866 | S | 5/2000 | Choi | D7/381 |
| D426,744 | S | 6/2000 | Wong | D7/384 |
| 6,113,016 | A | 9/2000 | Vedefors | 241/169.1 |
| D451,200 | S | 11/2001 | Johansen et al. | D24/197 |
| D476,522 | S | 7/2003 | Renz | D7/376 |
| 6,736,538 | B2 * | 5/2004 | Bittner | 366/199 |
| D495,553 | S | 9/2004 | Moss et al. | D7/376 |
| 7,036,975 | B2 | 5/2006 | Renz | 366/130 |
| D529,336 | S | 10/2006 | Katz et al. | D7/414 |
| D534,393 | S | 1/2007 | de Groote | D7/376 |
| D551,020 | S * | 9/2007 | Kozlowski et al. | D7/412 |
| D557,984 | S * | 12/2007 | Kozlowski et al. | D7/412 |
| 2005/0258286 | A1 | 11/2005 | Katz et al. | 241/37.5 |
| 2008/0106970 | A1* | 5/2008 | Kozlowski et al. | 366/331 |
| 2008/0253224 | A1* | 10/2008 | Kozlowski et al. | 366/342 |

* cited by examiner

FOOD MIXING MACHINE AND AGITATOR THEREFOR

TECHNICAL FIELD

This invention relates to a food mixing machine of the type having a rotatable shaft which carries an agitator. More particularly, this invention relates to an agitator which efficiently mixes foods, such as milkshakes or the like, in a cup.

BACKGROUND ART

Machines which are adapted to mix foods in a cup are well known in the art. Typically, these machines are used in fast food establishments, ice cream parlors, or the like, and utilize some type of agitating device carried at the end of a rotatable shaft. One prior art agitator includes a ring having a central disk extending from one side of the ring to the other side of the ring. The user fills a cup with the food, such as ice cream, and condiments such as candies or the like, and then positions the cup so that the agitator is in the food. When the machine is turned on, the agitator is rotated with the intention of mixing the candies into the ice cream. The user can often assist this process by moving the cup circumferentially or vertically.

However, the prior art mixing machine and agitator operated as described above are not without their problems. First, this agitator is not capable of thoroughly and efficiently mixing the majority of the volume of the cup, including the breaking up of large particles. In addition, this agitator does not mix the materials well at the sides or bottom of the cup, and if the user attempts to manipulate the cup to do so, the configuration of the prior art agitators can potentially cause damage to the sides or bottom of the cup.

In an effort to solve these problems, another agitator has been designed which is provided with a cloverleaf-shaped plate at the bottom thereof. This plate assists in the protection of the bottom of the cup and improves the mixing of some types of products, but the efficient mixing of relatively thin mixtures such as milkshakes remains a problem.

Thus, the need exists for a mixing machine with an improved agitator which is free of the problems plaguing the prior art.

DISCLOSURE OF THE INVENTION

It is thus an object of one aspect of the present invention to provide food mixing machine with an agitator that efficiently and thoroughly mixes food in a cup.

It is another object of an aspect of the present invention to provide an agitator, as above, which mixes the food located at the bottom of the cup.

It is an additional object of an aspect of the present invention to provide an agitator, as above, which will break up large particles in the food being mixed.

It is yet another object of an aspect of the present invention to provide an agitator, as above, which will not damage the sides or bottom of the cup.

These and other objects of the present invention, as well as the advantages thereof over existing prior art forms, which will become apparent from the description to follow, are accomplished by the improvements hereinafter described and claimed.

In general, an agitator made in accordance with one aspect of the present invention includes a shaft which is adapted to be attached to a rotatable shaft of a food mixer. A first disk is carried by the shaft. Slat walls are positioned between the first disk and a second disk. The slat walls together form a generally parabolic ring.

In accordance with another aspect of the invention, an agitator is adapted to be attached to a rotatable shaft of a food mixer. The agitator includes a first disk, a second disk, and a blade positioned between the first and second disks. The blade has a generally parabolic shape.

An agitator according to yet another aspect of the invention includes a shaft which is adapted to be attached to a rotatable shaft of a food mixer. A first disk is carried by the shaft, and a second disk is spaced from the first disk. Each disk is generally circular and is curved upwardly in one direction and downwardly in a direction transverse to the one direction.

A food mixer made in accordance with the present invention includes a rotatable shaft and an agitator having a shaft carried by the rotatable shaft. A first disk is carried by the agitator shaft. Slat walls are positioned between the first disk and a second disk. The slat walls together form a generally parabolic ring.

A preferred exemplary agitator for a food mixer according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
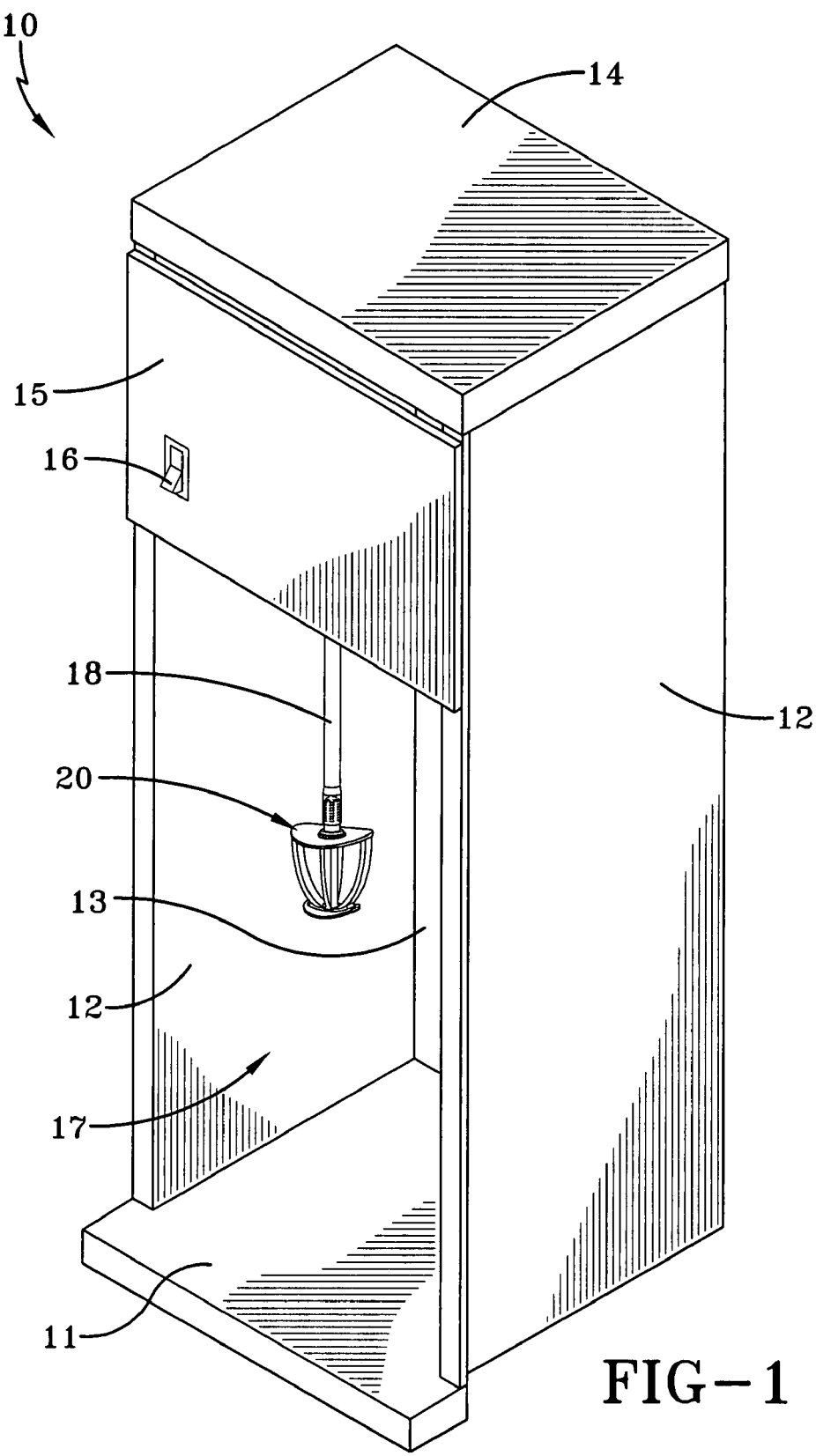
FIG. 1 is a somewhat schematic perspective view of a food mixer and agitator made in accordance with the present invention.
Figure 2:
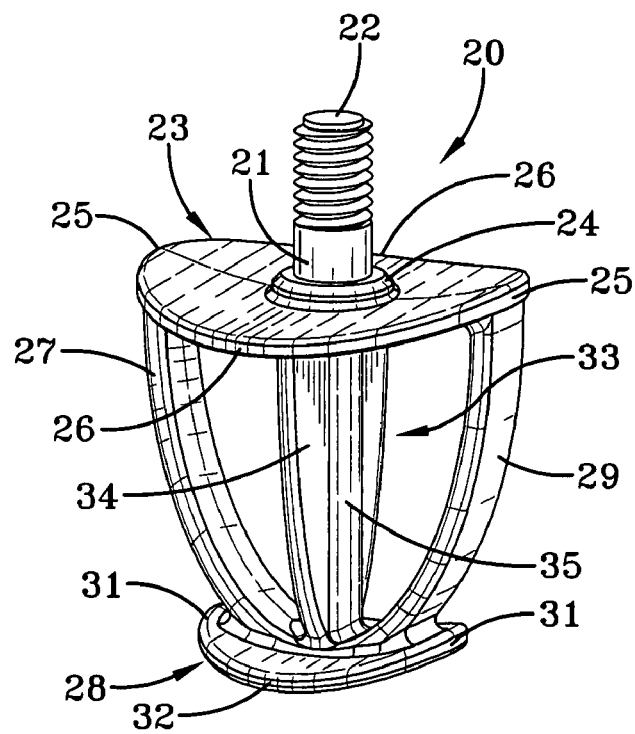
FIG. 2 is a top, right side, front perspective view of the agitator of the present invention.
Figure 3:
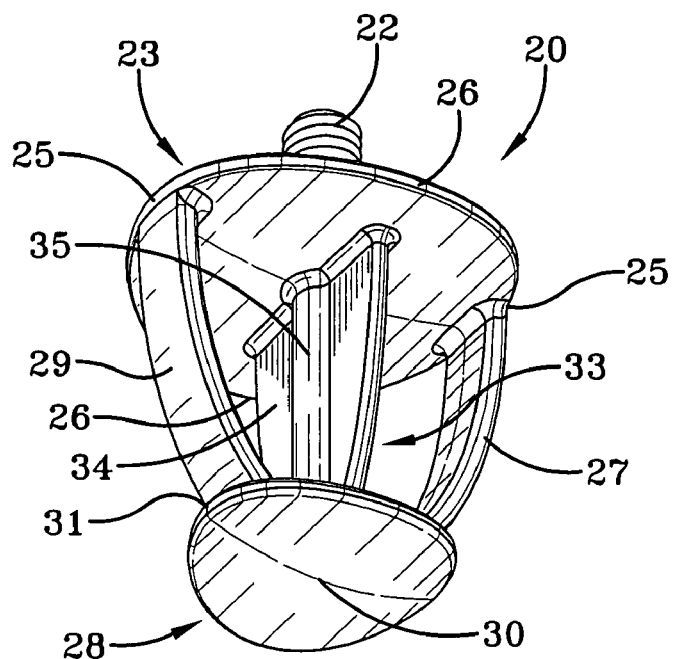
FIG. 3 is a bottom, rear, left side perspective view of the agitator of the present invention.

A food mixer is generally indicated by the numeral 10 and is shown in FIG. 1 as including a base 11, opposed side walls 12 extending upwardly from base 11, and a rear wall 13 extending upwardly from base 11 between the side walls 12. A cover 14 is positioned on top of walls 12 and 13 and a face plate 15 extends between side walls 12 near the top thereof. Face plate 15 carries a power switch 16 which is utilized to selectively activate or deactivate a motor (not shown) which is housed between cover 14, side walls 12, face plate 15, and rear wall 13. It should be appreciated that means other than switch 16 may be utilized to activate the motor. The front of mixer 10, below face plate 15, is open to form an open compartment 17. A motor shaft 18 extends downwardly from the motor and into the compartment 17. Shaft 18 carries an agitator made in accordance with the present invention and generally indicated by the numeral 20. Upon activation of the motor, shaft 18 and agitator 20 will rotate to mix food, such as milkshakes or the like, in a cup which is positioned around shaft 18 so that the agitator 20 is within the food. While agitator 20, now to be described, has been shown in the environment of food mixer 10, it will be appreciated that agitator 20 could well be utilized in machines of a wide variety of configurations, even hand-held mixers.

Figure 4:
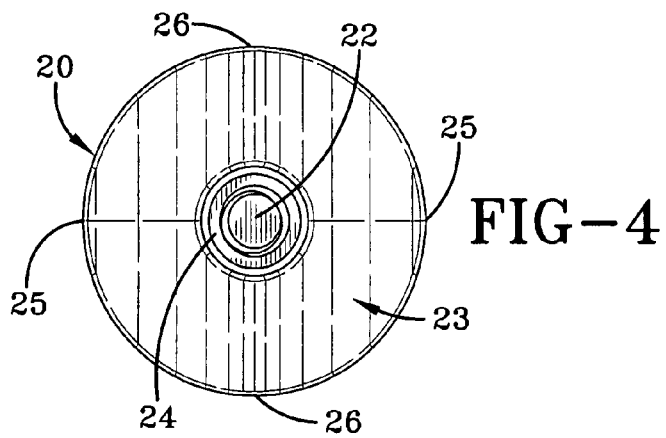
FIG. 4 is a top plan view thereof.
Figure 5:
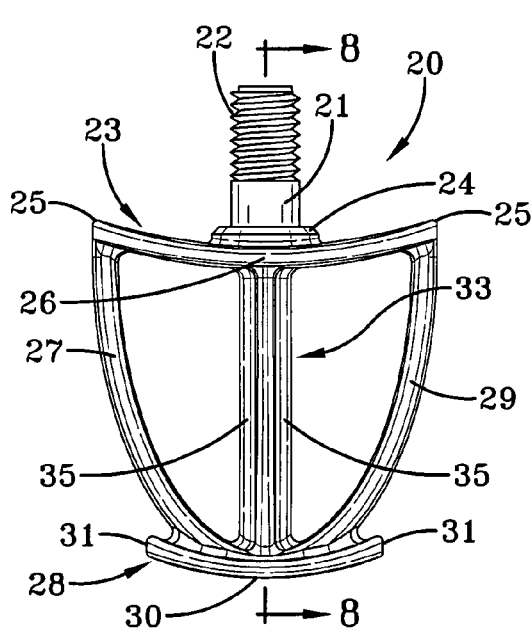
FIG. 5 is a front elevational view of the agitator thereof.
Figure 7:
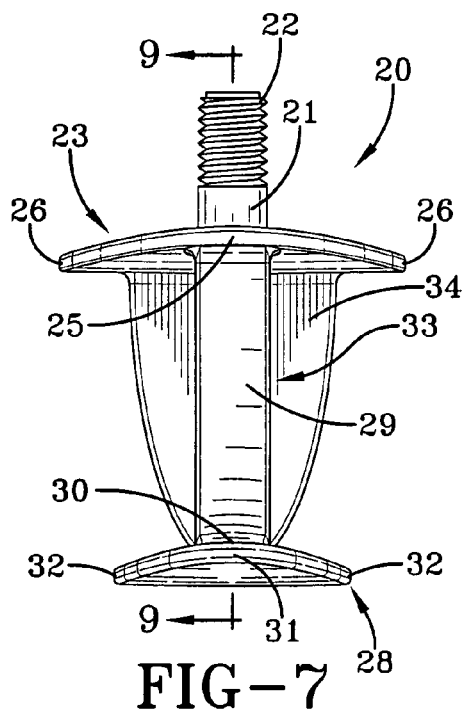
FIG. 7 is a side elevational view thereof.
Figure 8:
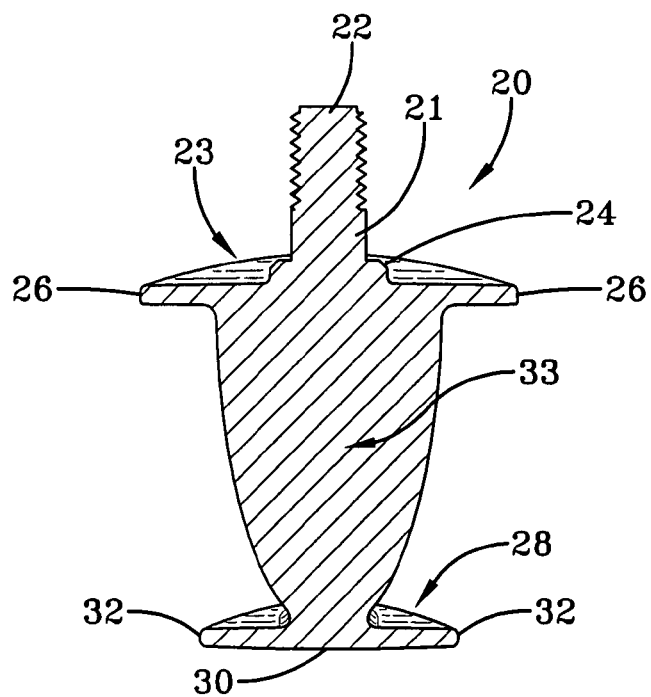
FIG. 8 is a sectional view taken substantially along line 8-8 of FIG. 5.
Figure 9:
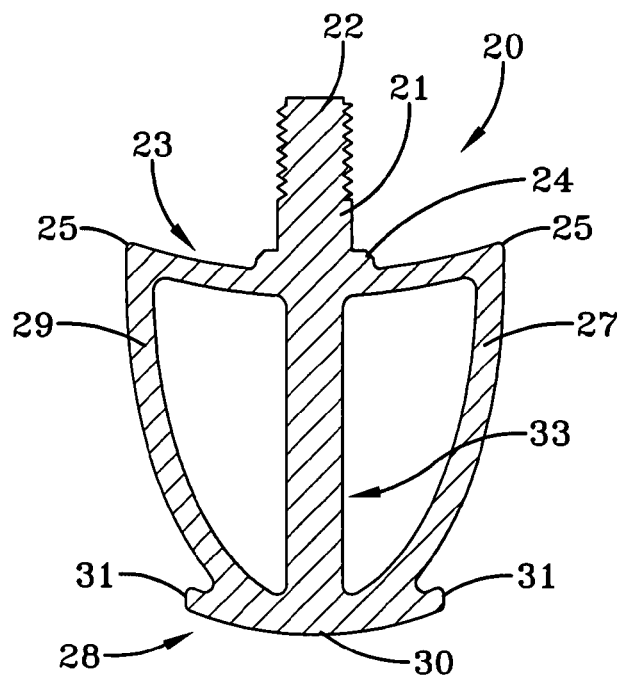
FIG. 9 is a sectional view taken substantially along line 9-9 of FIG. 7.

Agitator 20, which can be made of a suitable plastic material such as food grade acetal or the like, includes a shaft 21 having a threaded end 22 which is adapted to be connected to the bottom end of motor shaft 18 thereby rendering agitator 20 rotatable with shaft 18. An upper disk, generally indicated by the numeral 23, is carried by shaft 21 and is generally circular when viewed in plan as shown in FIG. 4. However, when viewed in elevation in one direction, as shown in FIGS. 5 and 9, disk 23 is curved upwardly from collar 24, where it is attached to shaft 21, to opposed upper peripheral extremities 25. But when viewed in elevation in a direction transverse or ninety degrees from that shown in FIG. 5, as shown in FIGS. 7 and 8, disk 23 is curved downwardly from collar 24 to opposed lower extremities 26.

Agitator 20 further includes a curved slat wall 27 extending downwardly from one of the extremities 25 of disk 23 to a lower disk generally indicated by the numeral 28. Another curved slat wall 29 is opposed to slat wall 27 and extends downwardly from the other extremity 25 of disk 23 to lower disk 28. Together, when viewed in elevation as shown in FIG. 5, walls 27 and 29 form a generally parabolic-shaped ring.

Figure 6:
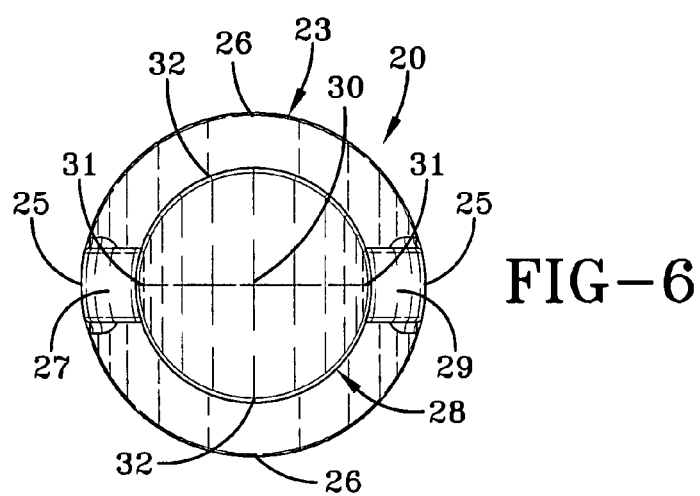
FIG. 6 is a bottom plan view of thereof.

Lower disk 28 is configured to generally parallel the configuration of upper disk 23. Thus, disk 28 is circular when viewed in plan as shown in FIG. 6, but when viewed in elevation in one direction, as shown in FIGS. 5 and 9, disk 28 is curved upwardly from its center 30, where it is attached to slat walls 27 and 29, to opposed upper peripheral extremities 31 adjacent to slat walls 27 and 29. But when viewed in elevation in a direction transverse or ninety degrees from that shown in FIG. 5, as shown in FIGS. 7 and 8, disk 28 is curved downwardly from center 30 to opposed lower extremities 32.

Agitator 20 also includes a central blade generally indicated by the numeral 33. Blade 33 extends between disks 23 and 28 and has generally parabolic-shaped faces 34 which run in a direction parallel to, or otherwise face, slat walls 27 and 29. A vertical hub 35 formed on faces 34 provides additional strength to blade 33.

When the agitator 20 is positioned in a cup full of material to be mixed, the motor of the mixer 10 can be actuated to turn shaft 18 and agitator 20. The rapid rotation of the slat walls 27 and 29, which form the parabolic ring, efficiently and thoroughly mixes and whips the majority of the cup volume. In particular, this whipping action easily breaks up large particles of food in the cup. At the same time, the parabolic blade 33 beats the ingredients against the slat walls 27, 29 of the parabolic ring to further enhance the whipping action.

In the meantime, the upper disk 23, due to its curvature, helps to pull the ingredients down, in a wave-like fashion, to direct the ingredients near the top of the cup to the mixing action of the parabolic ring. Such movement also creates a suction which, in conjunction with the parabolic ring, will tend to aerate the product. The ingredients near the bottom of the cup are mixed by the lower disk 28 and also directed by the lower disk 28 upwardly toward the action of the parabolic ring. As a result, the entire volume of ingredients can be acted upon by agitator 10.

Upper disk 23 also serves to protect the cup from damage which could occur if the slat walls 27, 29 of the parabolic ring were allowed to engage the cup. Similarly, the lower disk 28 protects the bottom of the cup from potential damage by presenting a flatter surface than would otherwise be presented for potential engagement with the cup.

It should thus be evident that a food mixer having an agitator as described herein substantially improves the art and otherwise accomplishes the objects of the present invention.

What is claimed is:

1. An agitator adapted to be attached to a rotatable shaft of a food mixer comprising a shaft adapted to be attached to the rotatable shaft, a first disk carried by said shaft, a second disk, slat walls between said first disk and said second disk, said slat walls together forming a generally parabolic ring, and a blade extending from said first disk to said second disk, said blade having a generally parabolic-shaped face.

2. The agitator of claim 1 wherein said slat walls are curved and opposed to each other.

3. The agitator of claim 1 wherein said blade is between said slat walls and said face faces said slat walls.

4. The agitator of claim 1 further comprising a hub on said face.

5. An agitator adapted to be attached to a rotatable shaft of a food mixer comprising a shaft adapted to be attached to the rotatable shaft, a first disk carried by said shaft, said first disk being generally circular and being curved upwardly in one direction and curved downwardly in a direction transverse to said one direction, a second disk, and slat walls between said first disk and said second disk, said slat walls together forming a generally parabolic ring.

6. The agitator of claim 5 wherein said second disk is generally circular and is curved upwardly in one direction and curved downwardly in a direction transverse to said one direction.

7. An agitator adapted to be attached to a rotatable shaft of a food mixer comprising a generally circular first disk curved upwardly in one direction and curved downwardly in a direction transverse to said one direction, a second disk, and a blade having a generally parabolic-shaped face positioned between said first disk and said second disk.

8. The agitator of claim 7 further comprising a first slat wall positioned between said first disk and said second disk, and a second slat wall positioned between said first disk and said second disk and opposed to said first slat wall.

9. The agitator of claim 8 wherein said slat walls are curved and together form a parabolic ring.

10. The agitator of claim 7 wherein said second disk is generally circular and is curved upwardly in one direction and curved downwardly in a direction transverse to said one direction.

11. An agitator adapted to be attached to a rotatable shaft of a food mixer comprising a shaft adapted to be attached to the rotatable shaft, a first disk carried by said shaft, a second disk, and means to carry said second disk spaced from said first disk, each said disk being generally circular and curved upwardly in one direction and downwardly in a direction transverse to said one direction.

12. The agitator of claim 11 wherein said means to carry includes slat walls extending between said first disk and said second disk, said slat walls together forming a parabolic ring.

13. The agitator of claim 11 wherein said means to carry includes a blade having a generally parabolic-shaped face extending between said first disk and said second disk.

14. A food mixer comprising a rotatable shaft and an agitator; said agitator having a shaft carried by said rotatable shaft, a first disk carried by said shaft, a second disk, slat walls between said first disk and said second disk, said slat walls being curved so as together forming a generally parabolic ring, and a blade extending from said first disk to said second disk between said slat walls, said blade having a generally parabolic face.

15. A food mixer comprising a rotatable shaft and an agitator; said agitator having a shaft carried by said rotatable shaft, a generally circular first disk carried by said shaft and curved upwardly in one direction and curved downwardly in a direction transverse to said one direction, a second disk, and slat walls between said first disk and said second disk, said slat walls being curved so as together forming a generally parabolic ring.

16. A food mixer comprising a rotatable shaft and an agitator; said agitator having a shaft carried by said rotatable shaft, a first disk carried by said shaft, a generally circular second disk, curved upwardly in one direction and curved downwardly in a direction transverse to said one direction and slat walls between said first disk and said second disk, said slat walls being curved so as together forming a generally parabolic ring.

* * * * *